US008843503B2

(12) United States Patent
Ayachitula et al.

(10) Patent No.: US 8,843,503 B2
(45) Date of Patent: Sep. 23, 2014

(54) METHODS AND APPARATUS FOR AUTOMATICALLY CREATING COMPOSITE CONFIGURATION ITEMS IN CONFIGURATION MANAGEMENT DATABASE

(75) Inventors: Naga A. Ayachitula, Elmsford, NY (US); Krishna S. Garimella, San Jose, CA (US); Yan Or, San Francisco, CA (US); Larisa Shwartz, Scarsdale, NY (US)

(73) Assignee: International Business Machines Corporation, Armonk, NY (US)

( * ) Notice: Subject to any disclaimer, the term of this patent is extended or adjusted under 35 U.S.C. 154(b) by 1390 days.

(21) Appl. No.: 11/479,532

(22) Filed: Jun. 30, 2006

(65) Prior Publication Data

US 2008/0005143 A1 Jan. 3, 2008

(51) Int. Cl.
*G06F 17/30* (2006.01)
*G06F 9/44* (2006.01)

(52) U.S. Cl.
CPC .......................................... *G06F 8/71* (2013.01)
USPC .......................................................... 707/755

(58) Field of Classification Search
USPC .......... 707/102, 100, 755; 709/100, 223, 224; 370/254; 719/328
See application file for complete search history.

(56) References Cited

U.S. PATENT DOCUMENTS 6,314,427 B1 * 11/2001 Goldman et al. ............ 707/100
6,343,291 B1 * 1/2002 Goldman ...................... 707/100
6,345,277 B1 * 2/2002 Goldman et al. ............ 707/100
6,791,948 B1 * 9/2004 Desnoyers et al. .......... 370/254
6,983,317 B1 * 1/2006 Bishop et al. ................ 709/223
2002/0198920 A1 * 12/2002 Resnick et al. .............. 709/100
2003/0037040 A1 * 2/2003 Beadles et al. .................... 707/1
2005/0102683 A1 * 5/2005 Branson et al. .............. 719/328
2006/0041660 A1 * 2/2006 Bishop et al. ................ 709/224
2007/0100892 A1 * 5/2007 Kephart et al. .............. 707/200

* cited by examiner

*Primary Examiner* — William Spieler
(74) *Attorney, Agent, or Firm* — Louis J Percello; Ryan, Mason & Lewis, LLP

(57) ABSTRACT

Methods and apparatus of automatically creating composite configuration items in a configuration management database are provided. A plurality of configuration items and a corresponding plurality of configuration item relationships are provided to the configuration management database. One or more composite configuration items are created from one or more of the plurality of configuration items in accordance with one or more types of the plurality of configuration items.

17 Claims, 5 Drawing Sheets

DISCOVER PLURALITY OF CIs — 402
LOAD CIs AND THEIR RELATIONSHIPS INTO CMDB — 404
DETERMINE CI TYPES OF THE PLURALITY OF CIs — 406
RETRIEVE CIs HAVING A GIVEN CI TYPE FROM THE CMDB — 408
CREATE A COMPOSITE CI FROM THE RETRIEVED CIs — 410
ALL CI TYPES USED TO RETRIEVE CIs ? — 412
END — 414

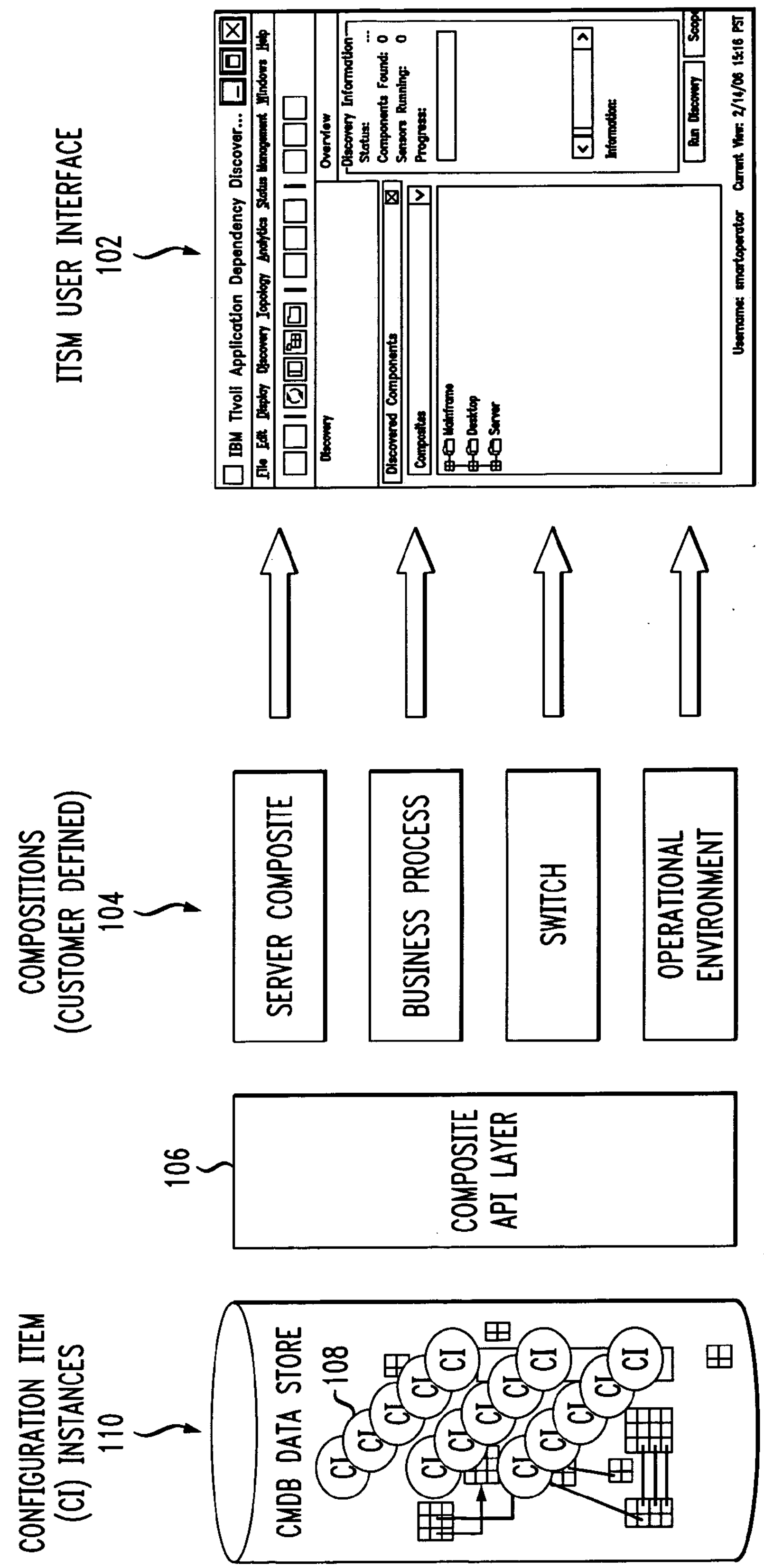
FIG. 1
CONFIGURATION ITEM (CI) INSTANCES
110
CMDB DATA STORE
108
CI
106
COMPOSITE API LAYER
COMPOSITIONS (CUSTOMER DEFINED)
104
SERVER COMPOSITE
BUSINESS PROCESS
SWITCH
OPERATIONAL ENVIRONMENT
ITSM USER INTERFACE
102
IBM Tivoli Application Dependency Discover...
File Edit Display Discovery Topology Analytics Status Management Windows Help
Discovery
Overview
Discovery Information
Status:
Components Found: 0
Sensors Running: 0
Progress:
Information:
Discovered Components
Composites
Mainframe
Desktop
Server
Run Discovery
Scope
Username: smartoperator
Current View: 2/14/06 15:16 PST CONFIGURATION MANAGEMENT DATABASE (CMDB)
308
COMPOSITE
COMPOSITE
COMPOSITE
314
CI
306
306
BULK LOADER
302
DISCOVERY SENSORS
304
REGISTRY
COMPOSITE C1 TYPE – 1
COMPOSITE C1 TYPE – 2
312
COMPOSITE CREATION AGENT
310
1
1
4
5

METHODS AND APPARATUS FOR AUTOMATICALLY CREATING COMPOSITE CONFIGURATION ITEMS IN CONFIGURATION MANAGEMENT DATABASE

CROSS REFERENCE TO RELATED APPLICATIONS

This application is related to: the U.S. patent application Ser. No. 11/479,745, entitled "Methods and Apparatus for Composite Configuration Item Management in Configuration Management Database;" the U.S. patent application Ser. No. 11/479,747, entitled "Methods and Apparatus for Global Service Management of Configuration Management Databases;" the U.S. patent application Ser. No. 11/479,356, entitled "Methods and Apparatus for Scoped Role-Based Access Control;" and the U.S. patent application Ser. No. 11/479,514, entitled "Methods and Apparatus for Managing Configuration Management Database via Composite Configuration Item Change History;" which are filed concurrently herewith and incorporated by reference herein.

FIELD OF THE INVENTION

The present invention relates to information technology (IT) systems and, more particularly, methods and apparatus for automatically creating composite configuration items (CI) in a configuration management database (CMDB).

BACKGROUND OF THE INVENTION

Large and complex IT service management environments that provide multiple services to a plurality of customers can create an unmanageable number of entities. CMDB CIs represent an extensive range of logical and physical entities and their complex relationships. A typical implementation of a CMDB may contain more than 800 abstract object classes, with implicit and explicit relationships between them that may be extended in an open-ended fashion. Organizing entities into dependency trees or graphs for a high-level view of the topology eases system management. A CMDB is broad and semantically rich enough that it may apply to higher layers such as, for example, a business process or a distributed application. A CMDB is also granular enough to represent, for example, tables in a database or enterprise Java beans (EJBs) used in an enterprise application. In real-world enterprise systems, there may be tens of thousands or more entities with complex relationships between them. Compositions are ideally suited to multi-layered topologies.

The more levels in a CMDB, the more information there is to be handled. This results in larger and more complex CMDB elements. The fewer levels in a CMDB, the less control and information there are about the IT infrastructure. If the CMDB scope is too narrow, important parts of the infrastructure are not easily checked. If the CMDB scope is too wide, the cumbersome database will be an obstacle that slows down all service and management processes. If there are too many levels, attributes, and relationships, it will take processes a great effort to maintain the CMDB. Too little detail can mean recording insufficient information about the CI's and related incidents, problems, symptoms and requests for comments (RFC).

Composition is a method for realization of virtualization of CMDB for extensibility and manageability of CIs in IT service management. Compositions are user defined higher order CIs. Although instances of composite CIs can be created manually, it is a tedious and laborious process to create them. Typically, a data center manages approximately 100,000 CIs in a single instance of CMDB. With such a volume of CIs, explicitly creating composite CIs also results in great expense.

SUMMARY OF THE INVENTION

In accordance with the aforementioned and other objectives, the embodiments of the present invention are directed towards methods and apparatus for CMDB management through the automatic creation of composite CIs.

For example, in one aspect of the present invention a method of automatically creating composite configuration items in a configuration management database is provided. A plurality of configuration items and a corresponding plurality of configuration item relationships are provided to the configuration management database. One or more composite configuration items are created from one or more of the plurality of configuration items in accordance with one or more types of the plurality of configuration items.

In additional embodiments of the present invention, the plurality of configuration items are discovered and loaded into the configuration management database. One or more types of the plurality of configuration items are determined. One or more of the plurality of configuration items are retrieved from the configuration management database of a given type of the one or more types of the plurality of configuration items. A composite is created from the one or more of the plurality of configuration items. The retrieval and creation steps may be repeated for each of the one or more types of the plurality of configuration items.

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 1 is a diagram illustrating composite CIs, according to an embodiment of the present invention;

DETAILED DESCRIPTION OF PREFERRED EMBODIMENTS

As will be described in detail below, the embodiments of the present invention introduce techniques for automatically creating composite CIs for management of a CMDB.

Referring initially to FIG. 1, a diagram illustrates composite CIs, according to an embodiment of the present invention. A user, at user interface 102, views a composite CI 104 from composite API layer 106 no differently than an atomic CI 108 from data layer 110. As a result, composite CIs 104 are modeled in the same way as atomic CIs 108. However, composite CIs 104 exist as distinct elements in the CMDB database.

Composite CIs are represented as a graph of supporting elements, which may be composite or atomic CIs. The graph is constructed by navigating relationships based on the definition of what composed the CI. The definition will be for the maximal graph that can make up the composite. Not all possible supporting elements are required in the composite CI in order to have a valid composition; only the root element is required.

Figure 2:
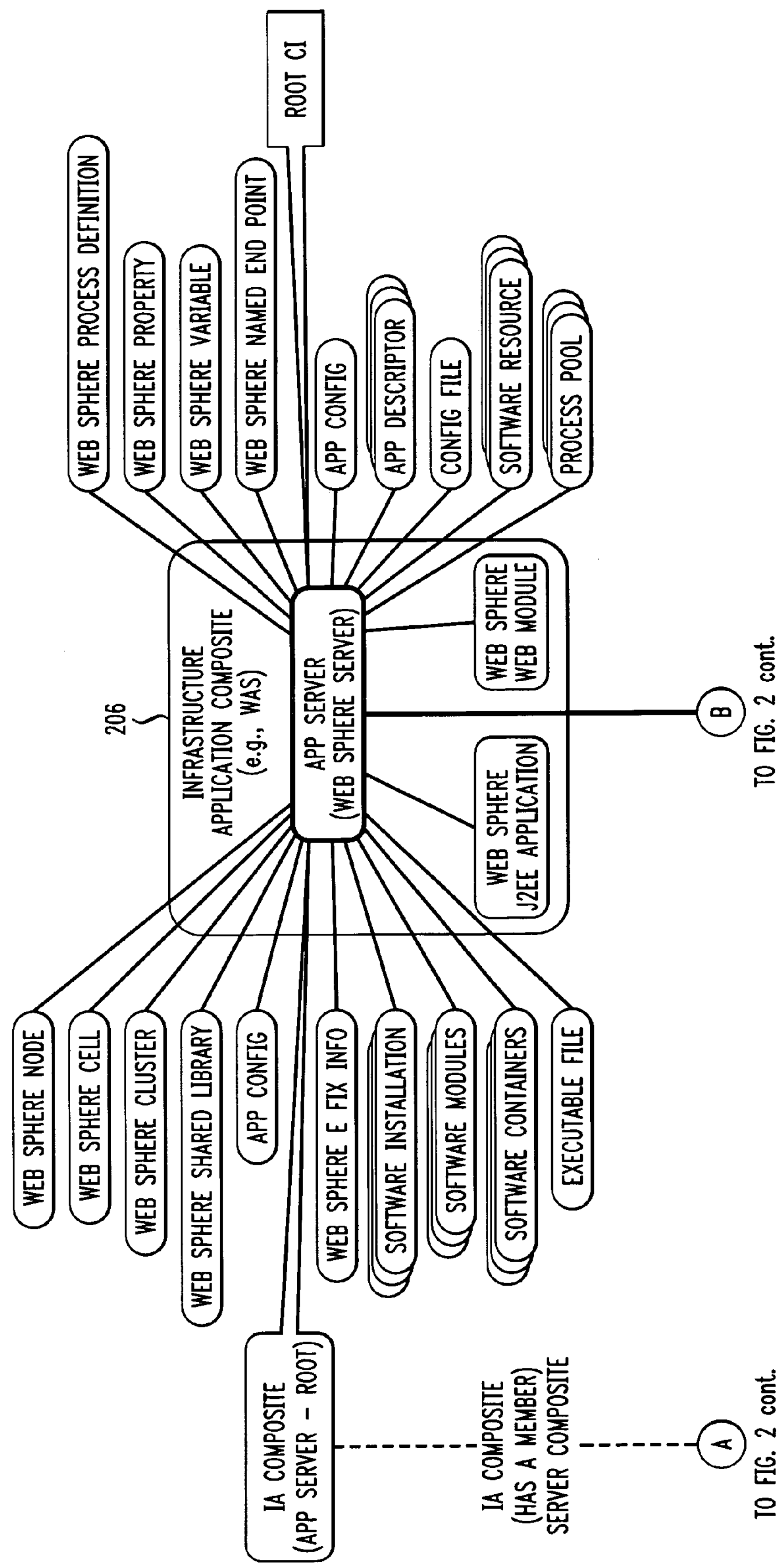
FIG. 2 is a diagram illustrating template-based composite CIs, according to an embodiment of the present invention.
Figure 2:
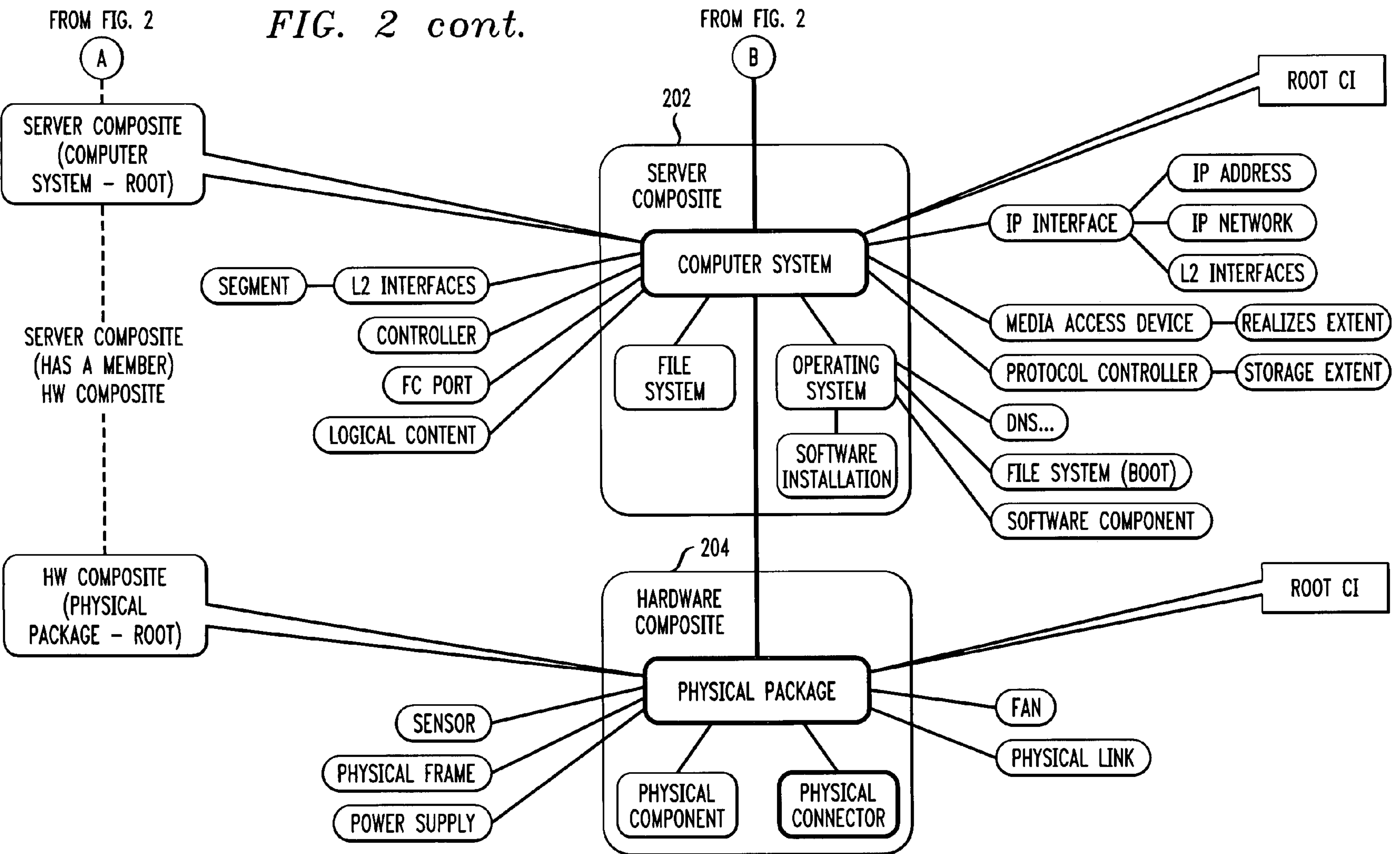

Referring now to FIG. 2, a diagram illustrates template-based composite CIs, according to an embodiment of the present invention. An example of a CI that is a composition of smaller entities, some of which are CIs themselves, is a server composite 202. A server composite 202 is made up of hardware 204, an operating system, installed and running software components, etc. An application composite 206 is also shown, and made up of software components and server composite 202 on which they run.

CIs can be composed by aggregating relationships to a main or root atomic CI. For example, a server has a root computer system object, which is related to hardware, operating system, software and networking elements. Further, an application has a root software system object that is related to underlying software components, which are in turn related to operating systems, software installations, software products, software updates, etc.

The identity of a composite CI is determined by the identity of its root atomic CI. Therefore, a root atomic CI must contain all the attributes necessary to identify the composite CI, even if some of those attributes are "derived" from supporting elements.

A composite CI can exist as long as its root atomic CI can be uniquely identified. The supporting elements can be added to, removed from, or updated in the composition over time. Thus, for example a server composite may be created with only a computer system element. The operating system, hardware and networking elements may be added at any time, without changing the identity of the server CI itself.

Figure 3:
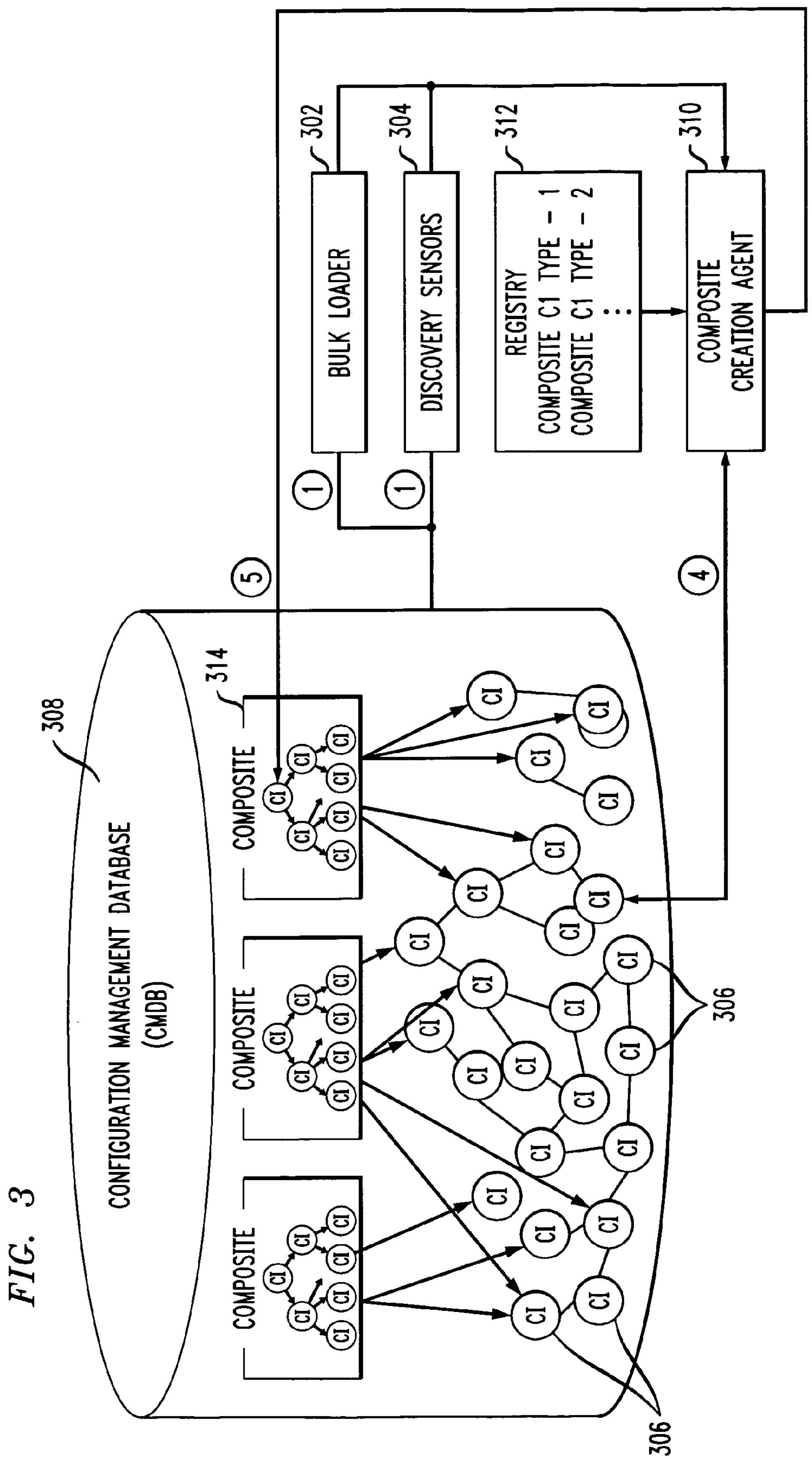
FIG. 3 is a diagram illustrating a CMDB and composite CI creation components, according to an embodiment of the present invention.

Referring now to FIG. 3, a diagram illustrates a CMDB and composite CI creation components, according to an embodiment of the present invention. A bulk loader 302 and/or discovery sensors 304 discover CIs 306 and load them into a CMDB 308. CIs 306 are loaded with their corresponding relationships to other CIs 306. Bulk loader 302 and/or discovery sensors 304 invoke a composite creation agent 310 once CIs 306 are fully loaded into CMDB 308. Composite creation agent 310 communicates with a registry 312 to determine CI types that should be scanned for in CMDB 308. Composite creation agent 310 scans for instances of a specific CI type in CMDB 308, and creates a composite CI 314 for all CIs 306 discovered in the scan. Composite creation agent 310 continues scanning and creating composite CIs for all CI types in registry 312.

Figure 4:
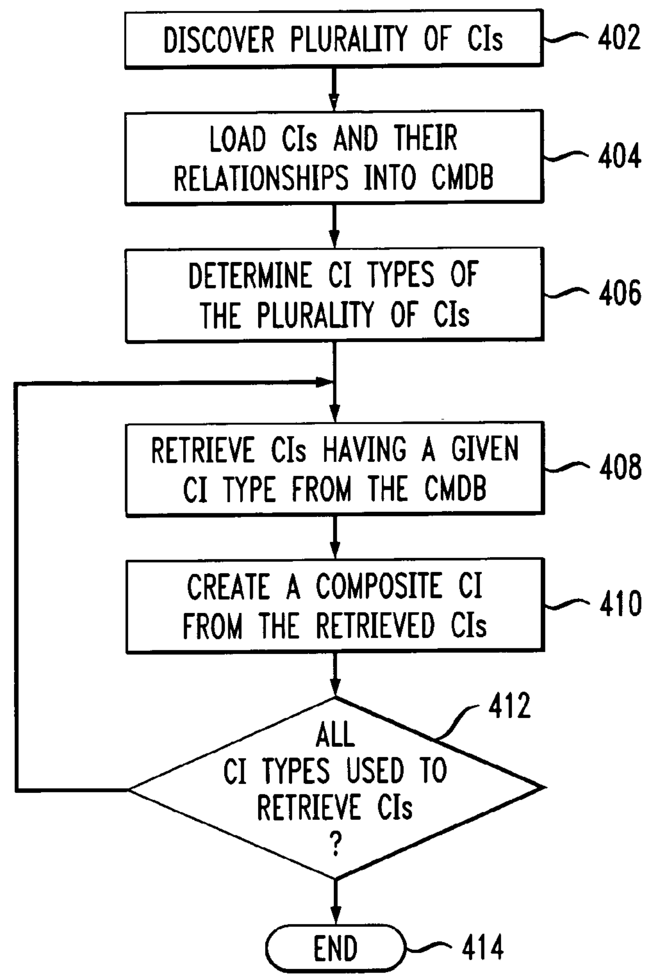
FIG. 4 is a flow diagram illustrating composite CI automatic creation methodology, according to an embodiment of the present invention.

Referring now to FIG. 4, a flow diagram illustrates a composite CI automatic creation methodology, according to an embodiment of the present invention. The methodology begins at block 402, where a plurality of CIs is discovered. In block 404, the plurality of CIs and their corresponding relationships with each other are loaded into a CMDB. In block 406, CI types of the CIs are determined. In block 408, CIs having a given CI type are retrieved from the CMDB. In block 410, a composite CI is created from the retrieved CIs. In block 412 it is determined if all determined CI types have been used to retrieve CIs. If all CI types have been used the methodology terminates in block 414. If all CI types have not been used, the methodology returns to block 408 to retrieve CIs having a next given CI type from the CMDB.

Figure 5:
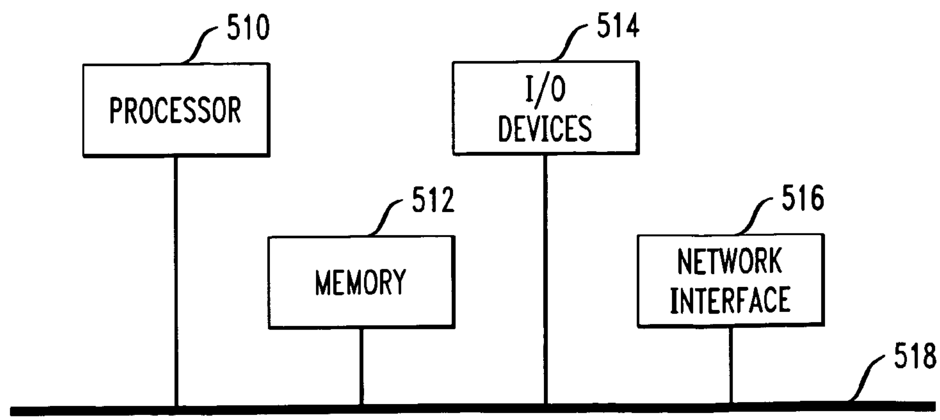
FIG. 5 is a diagram illustrating an illustrative hardware implementation of a computing system in accordance with which one or more components/methodologies of the present invention may be implemented, according to an embodiment of the present invention.

Referring now to FIG. 5, a block diagram illustrates an exemplary hardware implementation of a computing system in accordance with which one or more components/methodologies of the invention (e.g., components/methodologies described in the context of FIGS. 1-4) may be implemented, according to an embodiment of the present invention.

As shown, the computer system may be implemented in accordance with a processor 510, a memory 512, I/O devices 514, and a network interface 516, coupled via a computer bus 518 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

Still further, the phrase "network interface" as used herein is intended to include, for example, one or more transceivers to permit the computer system to communicate with another computer system via an appropriate communications protocol.

Software components including instructions or code for performing the methodologies described herein may be stored in one or more of the associated memory devices (e.g., ROM, fixed or removable memory) and, when ready to be utilized, loaded in part or in whole (e.g., into RAM) and executed by a CPU.

The automatic creation of composite CIs allows a customer to focus on creating the virtual composition templates of CIs and not the individual composite CI instances. CI types may be managed via externalized policies and rules in the registry. Once a CI type is registered, the composite instances may be created automatically.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A computer-implemented method of automatically creating composite configuration items in a configuration management database of a configuration management database system, comprising executing the following steps on a computer:

providing a plurality of configuration items and a corresponding plurality of configuration item relationships to the configuration management database of the configuration management database system; and automatically creating one or more composite configuration items in the configuration management database of the configuration management database system from one or more of the plurality of configuration items selected by the computer in accordance with one or more types of the plurality of configuration items, each of the one or more composite configuration items being represented as a graph of a plurality of supporting elements and comprising at least one root element, the at least one root element being used to identify a given composite configuration item within the configuration management database;

wherein the step of automatically creating one or more composite configuration items comprises the steps of:

determining one or more types of the plurality of configuration items;

retrieving one or more of the plurality of configuration items from the configuration management database of a given type of the one or more types of the plurality of configuration items; and creating a composite from the one or more of the plurality of configuration items;

wherein the retrieving step comprises scanning the configuration management database for the one or more of the plurality of configuration items of the given type of the one or more types of the plurality of configuration items.

2. The method of claim 1, wherein the plurality of configuration items are discovered and loaded with at least one of one or more discovery sensors and a bulk loader.

3. The method of claim 1, further comprising the step of repeating the retrieving and creating steps for each of the one or more types of the plurality of configuration items.

4. The method of claim 1, wherein the determining, retrieving and creating steps are performed by a composite creation agent.

5. The method of claim 4, wherein the composite creation agent is invoked by at least one of one or more discovery sensors and a bulk loader.

6. The method of claim 1, wherein the step of determining one or more types of the plurality of configuration items, comprises the step of looking up one or more types of the plurality of configuration items in an external configuration type registry.

7. Apparatus for automatically creating composite configuration items in a configuration management database of a configuration management database system, comprising:

a memory; and at least one processor coupled to the memory and operative to: (i) provide a plurality of configuration items and a corresponding plurality of configuration item relationships to the configuration management database of the configuration management database system; and (ii) automatically create one or more composite configuration items in the configuration management database of the configuration management database system from one or more of the plurality of configuration items selected by the at least one processor in accordance with one or more types of the plurality of configuration items, each of the one or more composite configuration items being represented as a graph of a plurality of supporting elements and comprising at least one root element, the at least one root element being used to identify a given composite configuration item within the configuration management database;

wherein the operation of automatically creating one or more composite configuration items comprises the steps of:

determining one or more types of the plurality of configuration items;

retrieving one or more of the plurality of configuration items from the configuration management database of a given type of the one or more types of the plurality of configuration items; and creating a composite from the one or more of the plurality of configuration items;

wherein the retrieving operation comprises scanning the configuration management database for the one or more of the plurality of configuration items of the given type of the one or more types of the plurality of configuration items.

8. The apparatus of claim 7, wherein the plurality of configuration items are discovered and loaded with at least one of one or more discovery sensors and a bulk loader.

9. The apparatus of claim 7, further comprising the operation of repeating the retrieving and creating steps for each of the one or more types of the plurality of configuration items.

10. The apparatus of claim 7, wherein the determining, retrieving and creating operations are performed by a composite creation agent.

11. The apparatus of claim 10, wherein the composite creation agent is invoked by at least one of one or more discovery sensors and a bulk loader.

12. The apparatus of claim 7, wherein the operation of determining one or more types of the plurality of configuration items, comprises the operation of looking up one or more types of the plurality of configuration items in an external configuration type registry.

13. An article of manufacture for automatically creating composite configuration items in a configuration management database of a configuration management database system, comprising a machine readable storage medium containing one or more programs which when executed by a computer implement the steps of:

providing a plurality of configuration items and a corresponding plurality of configuration item relationships to the configuration management database of the configuration management database system; and automatically creating one or more composite configuration items in the configuration management database of the configuration management database system from one or more of the plurality of configuration items selected by the computer in accordance with one or more types of the plurality of configuration items, each of the one or more composite configuration items being represented as a graph of a plurality of supporting elements and comprising at least one root element, the at least one root element being used to identify a given composite configuration item within the configuration management database;

wherein the step of automatically creating one or more composite configuration items comprises the steps of:

determining one or more types of the plurality of configuration items;

retrieving one or more of the plurality of configuration items from the configuration management database of a given type of the one or more types of the plurality of configuration items; and creating a composite from the one or more of the plurality of configuration items;

wherein the retrieving step comprises scanning the configuration management database for the one or more of the plurality of configuration items of the given type of the one or more types of the plurality of configuration items.

14. The article of claim 13, wherein the plurality of configuration items are discovered and loaded with at least one of one or more discovery sensors and a bulk loader.

15. The article of claim 13, further comprising the step of repeating the retrieving and creating steps for each of the one or more types of the plurality of configuration items.

16. The article of claim 13, wherein the determining, retrieving and creating steps are performed by a composite creation agent invoked by at least one of one or more discovery sensors and a bulk loader.

17. The article of claim 13, wherein the step of determining one or more types of the plurality of configuration items, comprises the step of looking up one or more types of the plurality of configuration items in an external configuration type registry.

* * * * *